(12) United States Patent
Bruhn (10) Patent No.: US 8,204,740 B2
(45) Date of Patent: Jun. 19, 2012

(54) VARIABLE FRAME OFFSET CODING

(75) Inventor: Stefan Bruhn, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 956 days.

(21) Appl. No.: 12/278,526

(22) PCT Filed: Feb. 6, 2006

(86) PCT No.: PCT/SE2006/000167
§ 371 (c)(1),
(2), (4) Date: Aug. 6, 2008

(87) PCT Pub. No.: WO2007/091927
PCT Pub. Date: Aug. 16, 2007

(65) Prior Publication Data
US 2009/0043567 A1    Feb. 12, 2009

(51) Int. Cl.
*G10L 19/00* (2006.01)
(52) U.S. Cl. ......... 704/201; 704/205; 704/230; 704/500
(58) Field of Classification Search ................. 704/205, 704/201, 230
See application file for complete search history.

(56) References Cited

U.S. PATENT DOCUMENTS

| 7,233,897 B2 * | 6/2007 | Kapilow | 704/229 |
| 2006/0083163 A1 * | 4/2006 | Rosen | 370/229 |

FOREIGN PATENT DOCUMENTS

WO    2005/059899    6/2005

OTHER PUBLICATIONS

Stenger, et al, A New Error Concealment Technique for Audio Transmission with Packet Loss, Telecommunications Institute, University of Erlangen-Nuremberg, Cauerstrasse 7, 91058 Erlangen, Germany, Eusipco 1996.*
Bruhn et al, "Concepts and solutions for link adaptation and inband signaling for the GSM AMR speech coding standard", *Vehicular Technology Conference*, May 1999, pp. 2451-2455, XP010342317.
Makinen et al., "AMR-WB+: A New Audio Coding Standard for $3^{rd}$ Generation Mobile Audio Services", *Acoustics Speech, and Signal. Processing*, Mar. 2005, pp. 1109-1112, XP010790838.
Sjoberg et al., "Real-Time Transport Protocol (RTP) Payload Format for Extended AMR Wideband (AMR-WB+) Audio Codec", *Internet Engineering Task Force*, Jul. 2004, pp. 1-32, XP002395527.
Schulzrinne et al., "RTP: A Transport Protocol for Real-Time Applications", *Internet Engineering Task Force*, Jul. 2003, pp. 1-87, XP002395528.

(Continued)

*Primary Examiner* — Vincent P Harper
(74) *Attorney, Agent, or Firm* — Nixon & Vanderhye, P.C.

(57) ABSTRACT

An encoding/decoding method, an coder/decoder (codec) and a radio communication device utilize a variable offset coding technique. In accordance with the technique, the start of processing of a first frame is time offset in relation to the end of the processing of the frame that precedes the first frame, the time offset bringing about a time gap between the end of the preceding frame and the start of processing the first frame. A substitution signal is inserted in the time gap.

74 Claims, 5 Drawing Sheets

OTHER PUBLICATIONS

International Search Report for PCT/SE2006/000107 mailed Oct. 18, 2006.
International Preliminary Report on Patentability for PCT/SE2006/0001.6 mailed Feb. 21, 2008.
Makinen et al., "AMR-WB+: a New Audio Coding Standard for 3$^{rd}$ Generation Mobile Audio Services", *Acoustics Speech, and Signal Processing*, Mar. 2005, pp. 1109-1112, XP010790838.
Lara-Barron et al, "Missing Packet Recovery of Low-Bit Rate Coded Speech Using a Novel Packet-Based Embedded Coder", Proc. of the European Signal Processing Conference, Signal Processing Theories and Applications, vol. 2, No. 5, Sep. 18, 1990-Sep. 21, 1990, Barcelona, pp. 1115-1118.
Sanneck et al, "Selective Packet Prioritization for Wireless VoIP", published for the Fourth International Symposium on Wireless Personal Multimedia Communication, Aalborg, Denmark, Sep. 2001.

* cited by examiner

VARIABLE FRAME OFFSET CODING

This application is the U.S. national phase of International Application No. PCT/SE2006/000167, filed 6 Feb. 2006, which designated the U.S., the entire contents of which are hereby incorporated by reference.

TECHNICAL FIELD OF THE INVENTION

The present invention relates to an improvement in frame based codecs and in particular to an encoding/decoding method, an coder/decoder (codec) and a radio communication device. The signal provided at the output of the improved frame based codec comprises frames of regular duration, although the start of a frame is time offset in relation to the end of the preceding frame. The time offset varies from frame to frame. The output signal from the improved codec has no fixed framing grid.

DESCRIPTION OF RELATED ART

With VoIP services over wireless it will be increasingly important to reduce the bit rate over the wireless links. The less is the bit rate associated with a single conversation, the more conversations can a radio channel of a given bandwidth transport.

One means to reduce the bit rate is to exploit variable rate coding. However, even if the bit rate is low, the transmitted speech parameters must anyway be packed into an IP/UDP/RTP packet with some extra overhead. This overhead may, however, be reduced to 3 or 4 bytes using header compression techniques such as ROHC (robust header compression). Lower layers, such as the data link layer and the physical layer, of the IP stack cause additional packetization overhead.

The paper by H. Sanneck, N. Le, M. Haardt and W. Mohr "Selective Packet Prioritization for Wireless VoIP", published for the Fourth International Symposium on Wireless Personal Multimedia Communication, Aalborg, Denmark, September 2001 discloses a method to tag frames that are possible "to cover with error concealment by using an ECU (error concealment unit)". Frames that can be covered by ECU:s are assigned lower priority such that if congestion occur in a network the lower priority packets are dropped first.

A similar approach is tested in the paper of LARA-BARRON; LOCKHART: 'Missing packet recovery of low-bit-rate coded speech using a novel packet-based embedded coder', PROC. OF THE EUROPEAN SIGNAL PROCESSING CONFERENCE, SIGNAL PROCESSING THEORIES AND APPLICATIONS vol. 2, no. 5, 18 Sep. 1990-21 Sep. 1990, BARCELONA, pages 1115-1118, but for an embedded DPCM (differential pulse code modulation) codec, where a different encoding is used for lower priority frames compared to normal-priority frames.

Segment vocoders used for very-low-rate speech coding apply a technique in which the speech is partitioned into units of varying length (segments), which then in turn are coded and transmitted. A similar technology is used by variable-frame-rate systems, which adjust the length of the codec frames to the duration for which the parameters describing the speech signal can be considered unchanged.

Problems with Existing Solutions

Even though the average source bitrate is sometimes greatly reduced with variable rate coding, the parameters that are produced will still need to be transmitted with extra packetization overhead. This overhead is not related to the size of the payload to be transmitted. Hence, VR codecs (variable rate codecs) in VoIP applications often suffer the problem that the source bit rate reductions they can provide do not translate to corresponding gross transmission rate savings.

A particular problem with variable rate extensions to the AMR codec (adaptive multi rate codec) is that such an extension is limited to the existing AMR modes. A more efficient variable-rate operation would however require the existence of a very low-rate mode at e.g. 2 kbps. However, again, the actual benefit of a new e.g. 2 kbps AMR mode would in practice for VoIP applications be rather limited due to the non-solved packetization overhead problem.

The problem with Sanneck's approach is that the encoder is unaware of the fact that a frame has been dropped. This leads to a state mismatch between encoder and decoder. Therefore one must be conservative with the use the frame drop in the network in order to not degrade the quality of the rendered speech too much.

The problem with Lara-Barrons approach is that bandwidth is not saved and packet rate is only marginally reduced.

Segment vocoders as well as variable-frame-rate systems operate on a fixed grid of frames for which a primary frame-wise vocoder parameter calculation is performed. In a next step they aim to merge several successive frames to variable-length units for which single parameter representations are derived. While such systems operate at very low bit rates, the main problem is that they are limited to completely parametric speech representations with relatively low quality. They are not suitable for high-quality coding e.g. according to analysis-by-synthesis paradigm which aim to approximate speech waveforms.

Many framed based codecs to be used for VoIP are originally designed for CS (circuit switched) applications. They hence divide the speech into segments of e.g. 20 ms which are encoded segment for segment utilizing the fixed framing grid of 20 ms. The result of the coding is a set of speech parameters. Several chunks of speech parameters, each chunk corresponding to 20 ms speech, are embedded in an RTP packet which is transported to the destination. The information in the RTP packet will thus correspond to a multiple of 20 ms speech segments, but the duration of the RTP packet, when transmitted via some transmission medium, may be much shorter, even shorter than 20 ms.

SUMMARY OF THE INVENTION

The technology disclosed herein relates to a method and arrangements for encoding a signal, i.e. the original speech signal, using a frame based codec, wherein the start of processing of a first frame is time offset in relation to the end of the processing of the frame that precedes the first frame.

The technology disclosed herein also relates to a method of decoding a digital signal comprising the step of offsetting the start of decoding of a first frame in relation to the end of the processing of the frame that precedes the first frame.

By delaying the start of processing of a frame, here referred to as the first frame for the sake of clarity, in relation to the end of the preceding frame such that the first frame has a positive time offset in relation to the end of the preceding frame, the positive time offset will bring about a time gap between the end of the preceding frame and the first frame.

The time gap varies from frame to frame and it is possible to insert signals therein, in the following referred to a substitution signal for the sake of clarity. The substitution signal can be an extrapolation of the signal in the preceding frame, an interpolation of the signals in the preceding and the first frames or a directly coded signal. The substitution signal may be transmitted using a media stream different from that used for the preceding and first frames. Exemplary the substitution signal is an audio-video signal and the signal in the first and preceding frames is an audio or speech signal. It should be noted that it can also be the other way around, i.e., the substitution signal is an audio signal or speech signal and the signal in the first and preceding frames is an audio-video signal.

Circuits are provided for controlling the amount of time offset. The time offset may be made dependent on the quality of the encoded signal and takes into consideration the deviation between the original signal and its coded version. Additional refinements of the time offset may be made such as taking coding distortion and coding of the first frame into consideration when controlling the time offset.

By bringing the start of processing of the first frame forward in time in relation to the end of the preceding frame such that the first frame has a negative time offset and partly overlaps the preceding frame the signal in the overlapping portions will be coded twice. This enhances the encoding of this signal portion. Distinct signal transition are possible to capture using negative time offsets.

The technology disclosed herein is well suited to use in connection with packet switched (PS) transmission of speech and audio using the RTP protocol, since RTP provides the capability to signal the time location of the codec frame(s) enclosed in each packet at an arbitrary time instant such that a flexible frame grid rather than the conventional fixed grid of e.g. 20 ms for use with VoIP would be possible.

DETAILED DESCRIPTION OF EMBODIMENTS

The technology disclosed herein will be described in connection with speech coding in FIGS. 1-11 and in connection with layered coding of video and audio signals in connection with FIG. 12.

Figure 1:
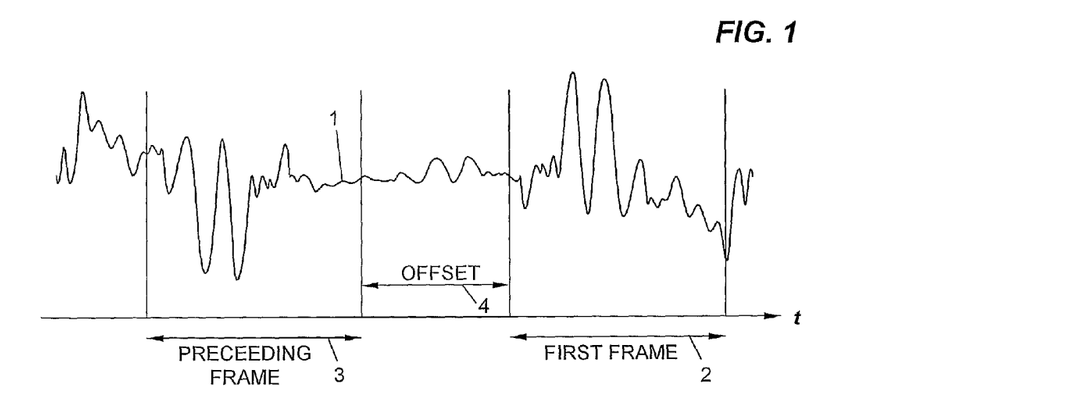
FIG. 1 is a signal diagram illustrating a basic aspect of the technology disclosed herein.

Refer to FIG. 1. A sampled digital speech input signal 1 is applied at an input of the codec. A frame based codec divides the input signal into 20 ms frames, one following the other in sequence without interrupts. In the codec the input speech signal is encoded. At the output of the codec a reconstructed speech signal corresponding to the encoded segment is present.

The basic idea, depicted in FIG. 1, is to operate a frame based codec in such a way that an encoded speech signal frame, illustrated by line segment 2 and in the following referred to as the first frame or a new frame, need not immediately follow the encoded speech signal in the preceding frame, illustrated by line segment 3, but starts with a variable time offset, illustrated by line segment 4 and sometimes below referred to as a gap, relative to the end of the preceding frame 3. The immediate gain of this inventive idea is that the effective frame rate of the codec is reduced, despite the codec frame length is constant. Since a bit rate is associated with each transmitted frame, the average bit rate is reduced. The codec, even though constant frame rate and possibly constant bit rate, is hence operated as a variable rate codec. However, in contrast to conventional variable rate codecs with that property, the packetization overhead is reduced.

According to one embodiment of the technology disclosed herein, the codec must have provisions to bridge the gap between the frames by means of a substitution signal. An extrapolation of the signal in the preceding frame, an interpolation of the signal in the preceding frame and in the first frame is possible to use as substitution in the time gap. A natural solution is to use error concealment, which essentially generates a reconstructed speech signal based on the set of speech coder parameters of the previous frame.

Figure 2:
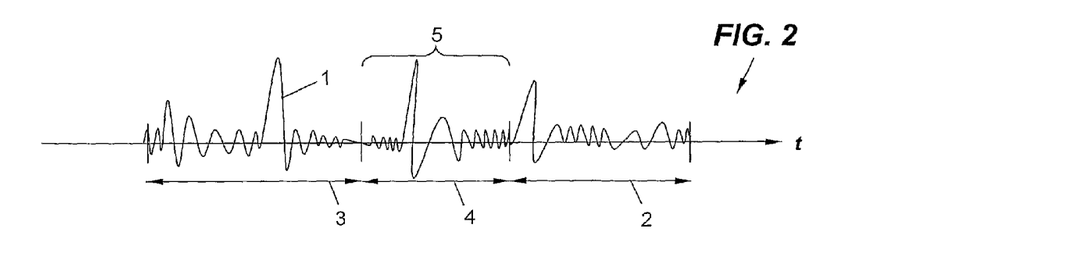
FIG. 2 is a signal diagram of a speech signal.
Figure 3:
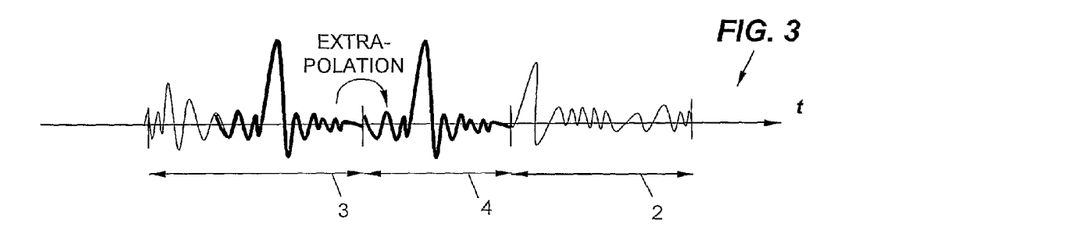
FIG. 3 is a signal diagram of a speech signal in accordance with an example embodiment of the technology disclosed herein.

In the following an extrapolation of the signal in previous frame will be described. Refer to FIG. 2. At the end of the preceding frame a part 5 of the input speech signal 1 is not used i.e. not directly encoded using the codec (cf. FIG. 2) and it is instead replaced by an extrapolation 6 of the speech signal in the previous frame. See FIG. 3. The extrapolation is of a duration corresponding to the time offset. The extrapolation will of course impair the quality reconstruction of the original speech signal. The extrapolation may not be driven so far that the quality of the reconstructed speech signal becomes bad or distinctly perceptible. A slight deterioration is tolerated. In order to control the quality and make the inventive idea functional, the encoder must have means to adaptively choose the start sample of each frame to be encoded, that is means that computes the time offset. This computation is based on some quality-based criterion and results in time offsets that vary from frame to frame. Different methods for control of the individual time offsets will be described below.

Figure 4:
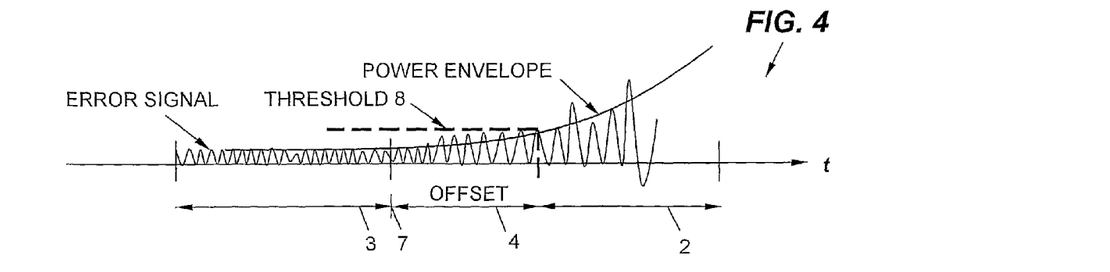
FIG. 4 is a signal diagram of the deviation between the two signals in FIG. 1 and FIG. 3.

A first basic method is described below with reference to FIGS. 4 and 5. In FIG. 4 an error signal obtained by comparison of the original speech signal with the extrapolation is shown. As appears, the longer the time offset (relative to the end of the previous frame, this end being marked off at 7 on the time axis) the more will the extrapolation deviate from the original, and the larger will be the error. When the error signal exceeds a threshold 8, the extrapolation is aborted, since if driven further, the quality of the resulting reconstructed speech signal would be unacceptable. It is thus clear that the time from the end of the previous frame to the time instant the error signal reaches the threshold will give a time offset associated with the first frame.

The technology disclosed herein can be applied to any existing speech codec using IP/UDP/RTP transport. The technology disclosed herein requires additional functionality in the codec but it does not require any changes to the codec's RTP transport format or changes to the codec's bit stream format. Hence, in principle, the technology disclosed herein works with existing decoders.

The technology disclosed herein requires that the receiver can properly handle the case of frames occurring at irregular time instants, which is an implementation aspect rather than a decoder aspect.

One basic embodiment of the technology disclosed herein is described with reference to FIG. 5. A frame based analysis-by-synthesis codec 9 with a coder 10 and incorporating a decoder 11, transfers its states to an extrapolator 13. The extrapolator has an output connected to a first input of time offset control means 14 which comprises a first deviation metric calculator 15 and a threshold circuit 16. At the output of the threshold circuit a value for the offset is obtained. This value is returned to the codec. The extrapolator comprises a non shown algorithm and has an input at which decoder states of the decoder are available. The original speech is connected to the second input. The two inputs of the time offset control means are connected to respective inputs of the first deviation metric calculator.

The codec is a conventional frame-based analysis-by-synthesis speech encoder, for example an AMR (adaptive multi rate) codec, having the property to locally generate a decoder reconstruction signal and its states. The algorithm used for extrapolation starts, according to the technology disclosed herein, after conventional encoding and local decoding of one frame. Instead of immediately encoding the next frame as traditional encoders do, the frame extrapolation algorithm generates an extrapolated speech signal based on the (local) decoder state. Typically, the frame extrapolation algorithm could be a local version of the decoder's ECU (error concealment unit). The extrapolated signal and the input speech signal are fed into the first deviation metric calculator that measures the deviation metric of the extrapolated signal from the speech signal. Specifically, a deviation metric is calculated as a function, see FIG. 6, of the duration of the extrapolated signal. It can be assumed that the shorter the duration the better the extrapolation and hence the smaller the deviation metric. The metric can be of type (weighted) SNR, spectral deviation or according to a more advanced perceptual criterion. The metric function is then fed into the first threshold circuit, which compares the metric with a threshold 18 and returns as time offset the time instant at which the first deviation metric function crosses the threshold. Refer to FIG. 6 which is a diagram illustrating the first deviation metric function at the output of the deviation metric calculator and the first threshold 18. The threshold is chosen such that it is ensured that the quality of the extrapolated signal is sufficient.

Rather than using a constant threshold it is appropriate to adjust the threshold e.g. based on the coding distortion calculated for the previously encoded frame. The offset obtained after thresholding is subsequently used as start time instant of the first frame. Such adjustments of the first threshold is symbolically illustrated with the double headed arrow 19 in FIG. 6.

Figure 5:
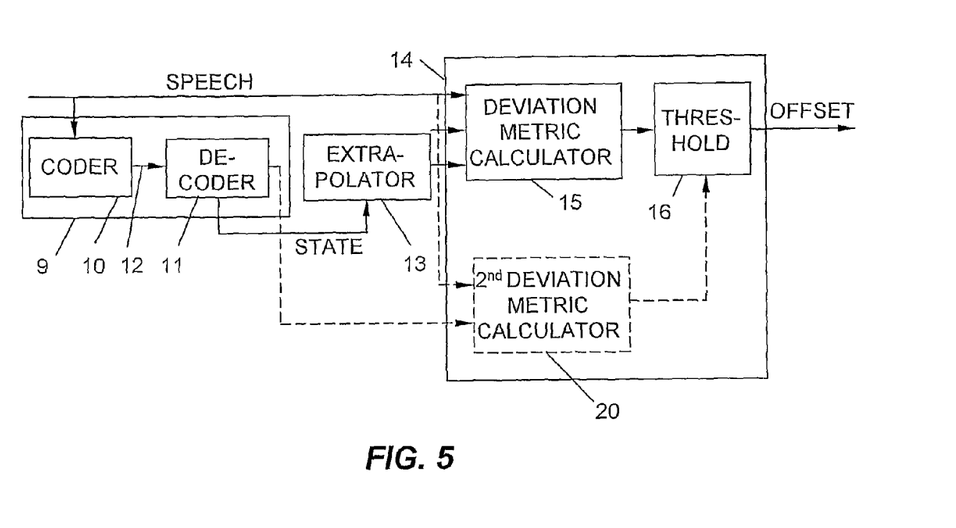
FIG. 5 is a block diagram of a first embodiment of the time offset generating means in accordance with the technology disclosed herein.
Figure 6:
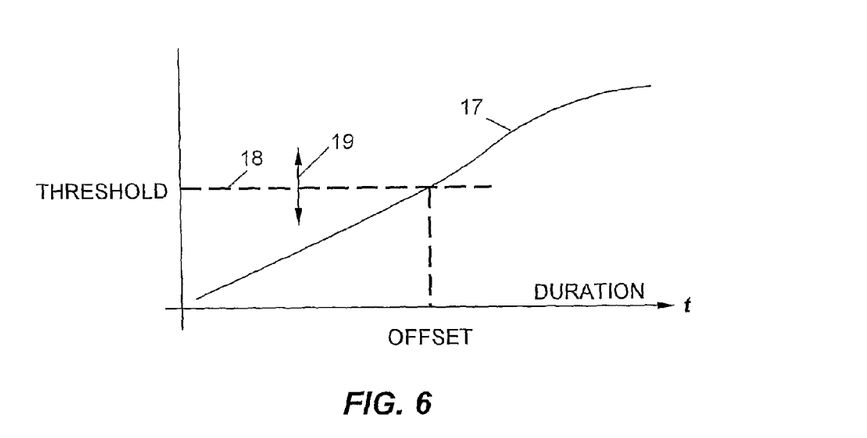
FIG. 6 is a diagram illustrating a deviation metric function obtained with the first embodiment and an associated threshold.

The means by which this is achieved are shown with dashed lines in FIG. 5 and comprises a second deviation metric calculator 20 with one input for the original speech signal and another connected to the output of the decoder. By comparing the decoded signal in the previous frame with the original signal in the same frame a value of the coding distortion is obtained. The output of the second deviation metric calculator is connected to an input of the threshold circuit and will thus adjust the first threshold with respect to the coding distortion.

A problem with the basic embodiment may be that the offset calculation does not take into consideration the coding distortion that would have been obtained with the conventional frame-based encoding. Put in other words one wants that the quality of the substitution signal be about the same as the one obtained for the first frame with a conventional codec. In the FIG. 5 the coding distortion relates to the one obtained in the preceding frame. Now we want it to be the one obtained for the first frame assuming zero offset. Thereby it is ensured that the actual speech quality will be as good as with the conventional codec.

A way to obtain this is to perform the coding of the first frame with zero offset as the conventional codec would do in addition. Then, an additional metric function is calculated for the locally decoded signal. The time offset is then derived by using this metric function of the coded first frame as a reference. The threshold obtained in doing so is now based on that metric function.

Figure 7:
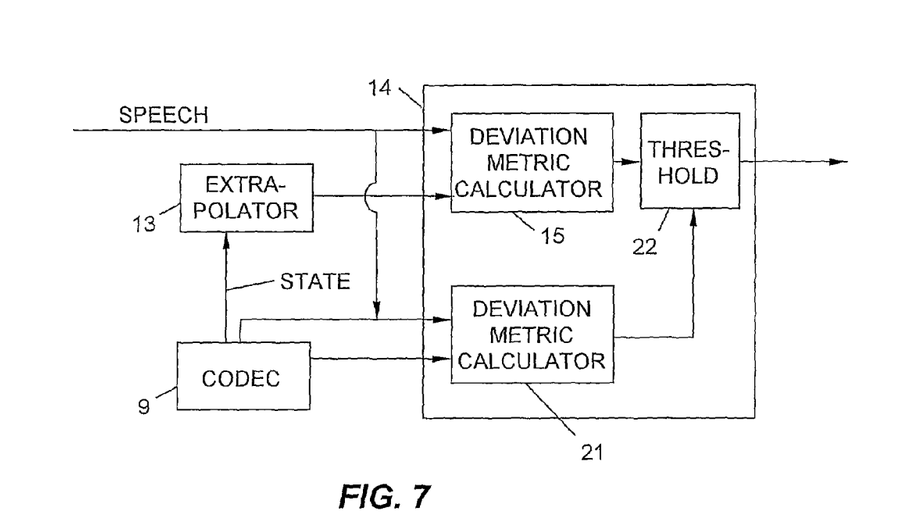
FIG. 7 is a block diagram of a second embodiment of the time offset generating means in accordance with the technology disclosed herein.
Figure 8:
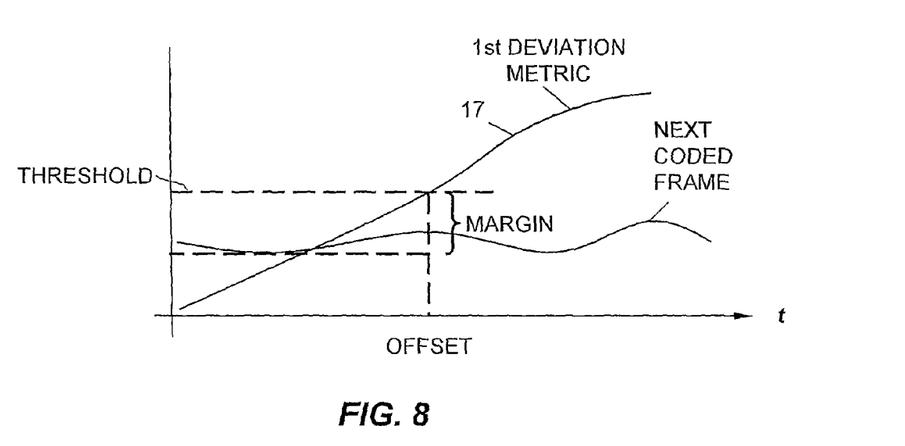
FIG. 8 is a diagram illustrating a deviation metric function obtained with the second embodiment and an associated threshold.

This is achieved with the refined implementation shown in FIG. 7 wherein parts corresponding to those in FIG. 4 have the same reference signs. Further to codec 9, the extrapolator 13 and the first deviation metric calculator 15 there is a third deviation metric calculator 21 and a second threshold circuit 22 connected as shown.

The codec encodes the speech in the first frame 2, though with zero offset as a conventional codec would do. The original speech signal 1 is applied at a second input to the third deviation metric calculator. At the output of the third calculator a third deviation metric function 19 (compare FIG. 8) for the locally encoded signal appear, this deviation metric function expressing the coding distortion of the first frame. In the second threshold circuit 22 the time offset is then derived by using the third deviation metric function of the coded first frame as a reference. The time instant at which the first deviation metric function 17, obtained with the first deviation metric calculator, exceeds the third deviation metric function 23 is used as a second threshold.

Preferably the second threshold plus some margin 24 is used as offset for the first frame. The offset will vary from frame to frame. The result achieved with the implementation in FIG. 7 is an improved signal quality of the reconstructed speech signal at the receiver end as compared with the implementation in FIG. 5.

Figure 9:
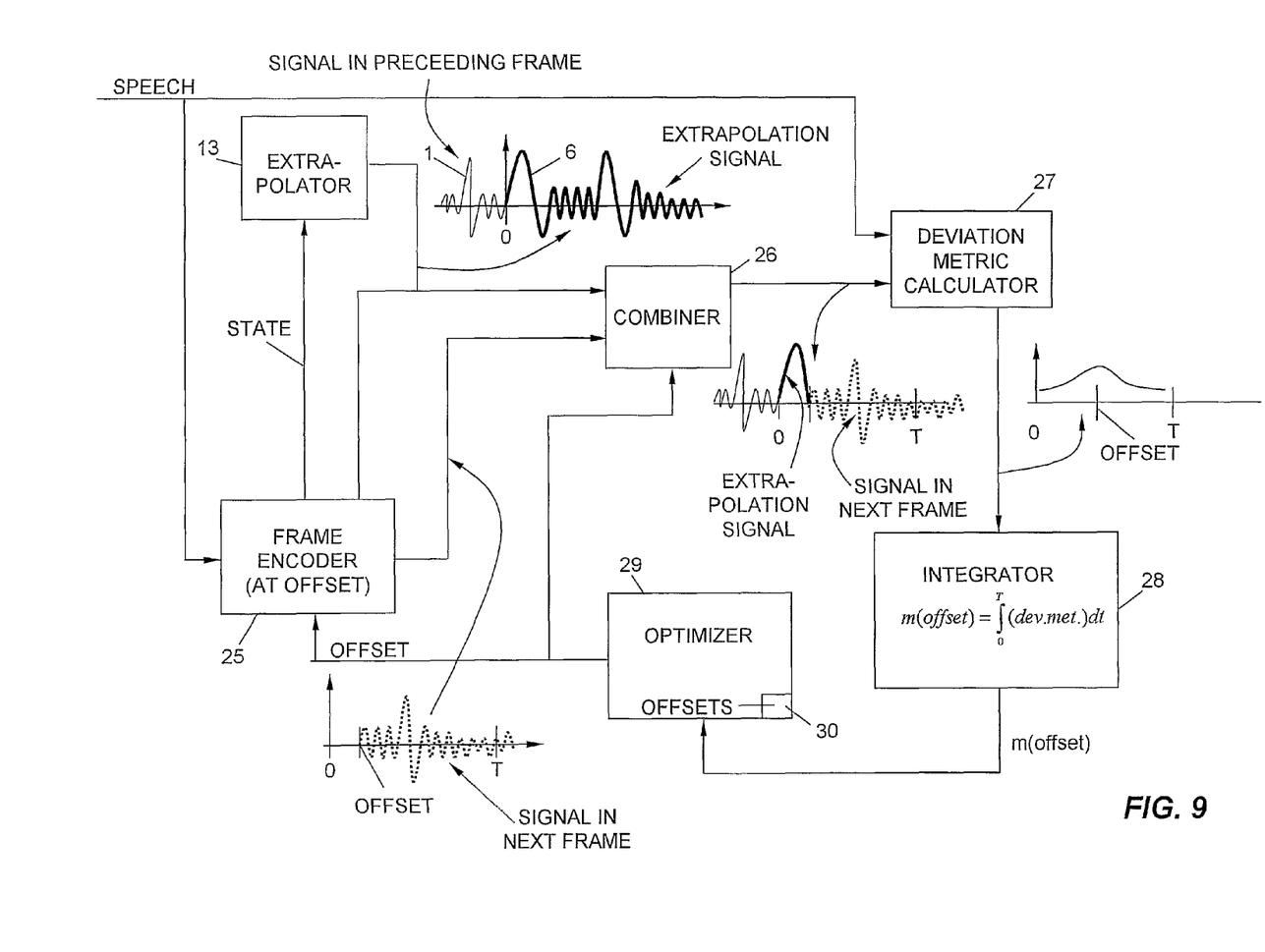
FIG. 9 is a block diagram of a third embodiment of the time offset generating means in accordance with the technology disclosed herein.

Even more accurate is a closed-loop method shown in FIG. 9, which further to the coding distortion during the extrapolation time interval also takes the decoded speech signal frame 3, that starts at the end of the extrapolated signal, into consideration when calculating the offset time. This may in particular be useful considering the fact that the codec may need some recovery time after extrapolation.

Further to the extrapolator 13 the closed-loop implementation shown in FIG. 9 comprises a frame codec 25, a combiner 26, a fourth deviation metric calculator 27, an integrator 28 and an optimizer 29 comprising a memory 30. The closed-loop method is described as follows: An extrapolation signal following immediately after the preceding frame 3 is generated as in the open loop methods above. In addition, the frame codec 25 encodes and decodes the speech signal in the first frame 2, this first frame having a candidate time offset selected among a plurality of candidate time offsets. The frame codec uses the extrapolation (or extrapolator state) 6 as input in order to set the codec states properly for the selected candidate time offset. The combiner combines the extrapolation signal with the signal in the first frame. The combined signal, referred to as a combined or composite signal, comprises a first and a second part. The first part is the extrapolation signal during the selected candidate time offset, and the second part is the signal in the first frame. The combination can e.g. be a simple concatenation, as shown in FIG. 9, of the two signals or the transition from one signal to the other is made smooth by using some overlap-and-add operation so that the extrapolated signal is phased out while the decoded first frame signal is phased in. The combined signal at the output of the combiner is applied at one input of the fourth deviation metric calculator 27 in which the combined signal is compared with the original speech signal applied at a second input to the calculator 27. As appears at the output of the fourth deviation metric calculator the calculated deviation increases during the selected candidate time offset. Thereafter the deviation decreases, as expected. In the integrator the third metric is evaluated up to a predefined time instant T, yielding a distortion metric for the time interval from the end of the previous frame up to the time instant T. The integrated metric is a measure of how good or bad the tested candidate time offset is. This integrated metric is then fed into the optimizer where it is stored in the memory. Following the storing of this integrated metric another one of the candidate time offsets is selected and a corresponding integrated metric is stored in the memory. The process is repeated until all of the candidate time offset values have been selected. Finally the optimizer selects, among the stored integrated metrics, the one with the least error, that is the minimum integrated metric. The associated candidate time offset is finally selected as time offset for the first frame.

What characterizes the open-loop methods described in FIGS. 5 and 7 are their simplicity and low complexibility while the closed-loop method is more accurate at the expense of being more complex and requiring more computation resources.

Variable frame offset coding in accordance with the technology disclosed herein leads to a certain probability distribution of frame offsets. That is, for some frames an offset of zero may be necessary, for other frames offsets greater than zero are possible. On long term there is an effective frame offset which is larger than zero. A typical value for such frame offset may be 2 ms. The gain of the technology disclosed herein in terms of bit rate savings can be illustrated with an example. A codec is assumed with a coding frame length of 20 ms and a bit rate of 200 bits per frame. In conventional operation of the codec the frame rate is 50 frames per second and the bit rate hence 10 kbps. With the technology disclosed herein, on the average 200 bits are transmitted per 20 ms plus the average offset duration of 2 ms. Hence, the resulting bit rate is 200 bits per 22 ms equaling to 9.09 kbps. The bit rate is thus reduced by almost 10%.

Rate Constrained Approach.

A codec with variable frame offsets according to the technology disclosed herein operates as a variable rate codec even if each frame is encoded with a constant number of bits. Assuming a codec with frame length p and using k bits per frame, then the local bit rate for the n-th frame encoded a time offset t is $$r(n) = \frac{k}{t(n) + p}$$

where the bit rate decreases with increasing time offset. The resulting average bit rate for all N encoded frames is hence $$R = \frac{1}{N} \sum_{n=1}^{N} \frac{k}{t(n) + p}$$

In a rate constrained coding approach the aim is to minimize the coding distortion under the constraint of a given target average bit rate. The methods described above for deriving the frame offsets can easily be extended to such a rate constrained approach. What is required is to modify the deviation metric used in the above methods. These metrics now additionally contain a term for the locally used bit rate weighted by some suitable factor λ allowing to trade the resulting coding distortion against the spent bit rate.

Put in other words one can say a cost function is associated with the bit rate. If you for one reason or another, for example due to local requirements, wants to use a certain bit rate, then this can be obtained by a corresponding variation of the time offset as described in the above section. Exemplary: if a lower bit rate is required, the offsets are made longer.

Coding with Negative Offset

As described above a suitable extrapolation algorithm is to operate the error concealment which is available in the decoder ECU. However, this is not the only possibility. Rather, at the cost of bit rate it is possible to use any available codec mode, in which case a coded representation of the extrapolation signal is transmitted and used. This can also be interpreted and more easily explained as using a negative frame offset for the next frame.

Figure 10:
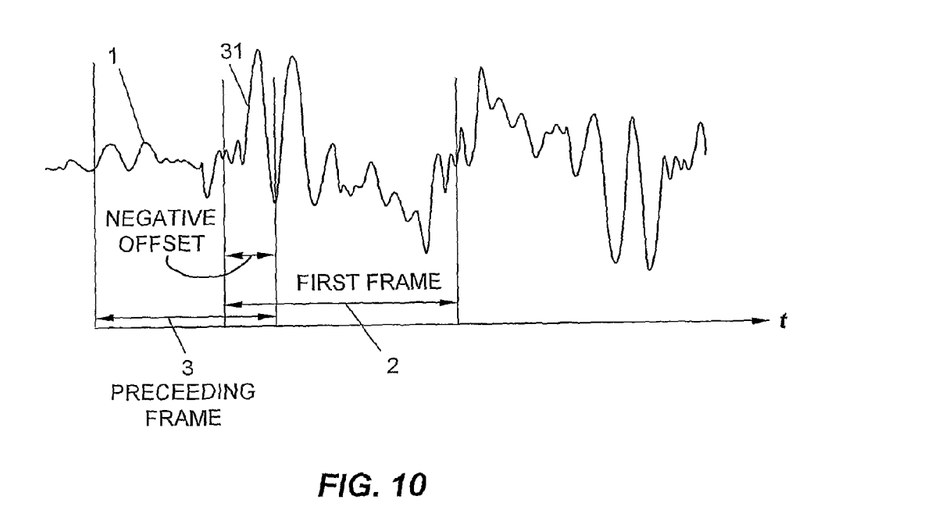
FIG. 10 is a signal diagram illustrating a variation of the basic idea in accordance with the technology disclosed herein.

Consider for example an embodiment with an AMR codec. As shown in FIG. 10 it is assumed that the preceding frame extends into a speech onset 31 or into a part of a signal where the signal has a distinct transition. If the bit rate used for the preceding frame is low, for example due to'transmission of "comfort noise" in a DTX operation, there is the risk that the onset is not adequately represented. This means the encoding does not capture the speech following the onset. To solve this problem the technology disclosed herein proposes the use of negative offsets. A new/first frame associated with a negative offset is started before the end of the preceding frame and will the frames to overlap, thereby capturing and encoding the onset properly. This is so because where the signals are overlapping there are two codings. Both frames are transmitted simultaneously. After decoding they are added together. Alternatively the signal in the first frame is phased into the signal in the preceding frame using a roll-on-roll-off function. It is possible to code the first frame with a higher bit rate than the previous frame. In that case the transition between the signal in the two frames is allowed to be hard. The signal in the previous frame is discarded and the signal in the first/next frame is used.

"Comfort noise" is a coding with very low bit rate which is used in DTX (discontinuous transmission) operation.

In speech coding it is assumed the speech is stationary in each frame. But if there is a distinct transition in the signal it is not correct to assume so. In such a case it is better to move the frame position relative to the signal in order to obtain a more stationary behaviour within the frame.

Another example where negative offset is used is the case where coding takes place with a low bit rate and suddenly a higher coding quality is required, for example when the signal changes from a speech signal into music. An example of this will be given below.

Look Ahead and Delayed Decision Coding.

Figure 11:
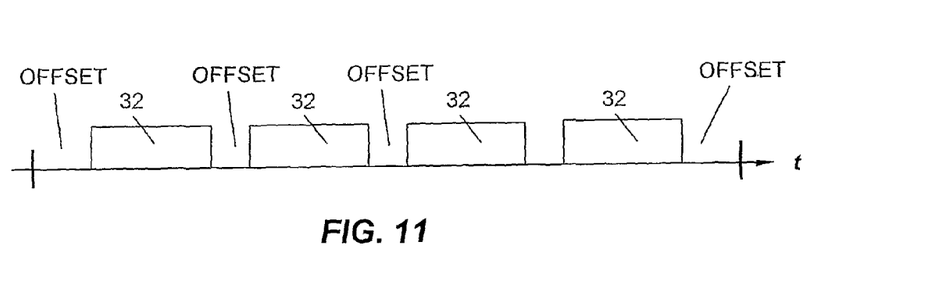
FIG. 11 is a signal diagram illustrating a method to calculate optimum time offsets simultaneously for a plurality of speech frames.

Refer to FIG. 11 which illustrates a situation with a plurality of frames. The coding of one frame has an impact on the coding of a successive frame. In this embodiment of the technology disclosed herein it is desired to simultaneously optimize the offsets of the plurality of frames.

Increased coding delay offers to use delayed decision coding as improvement possibility. One embodiment is to optimize the offsets of a multitude of frames and select coding modes for these frames such that the overall distortion at a given bit rate is minimized.

In case of coding with negative frame offset resulting in overlapping codec frames, it is possible to assign particular weights to the coding error of only certain parts of one frame. Exemplary, in the case shown in FIG. 11 it may be beneficial to do the encoding of a previous frame with a particular weight on the non-overlapping part of the frame, considering that the onset is better captured with the new/first frame shown in FIG. 10.

Interpolation.

Instead of using an extrapolation signal in the time gap interpolation can be used. The substitution signal for the gap between the transmitted frames is generated based on both the previous and the first frame, or based on an earlier frame than the previous frame and the first frame. Such an improvement is possible at the expense of additional delay.

Frame Offsets with Fractional Sample Resolution

Additional coding gain may be possible when allowing frame offsets even with fractional sample resolution. In a VoIP context using IP/UDP/RTP this solution requires setting the timestamp clock to a multiple of the signal sampling frequency.

Scalability.

Figure 12:
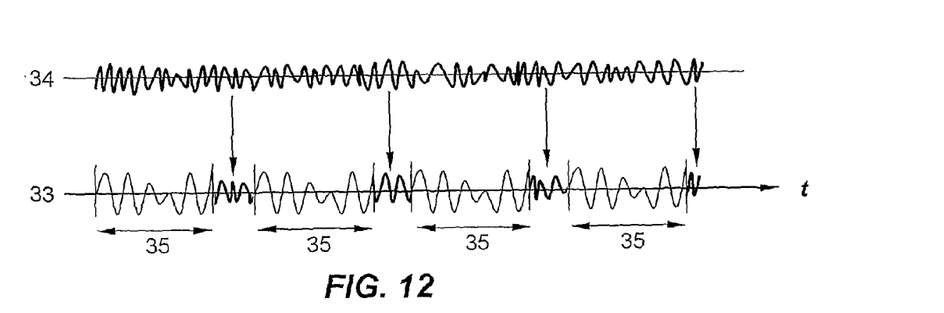
FIG. 12 is a schematic illustration of encoding using a layered scalable coder.

Refer to FIG. 12 wherein two media streams are encoded in a scalable, layered codec. A first layer such as the core layer 33 provides coding of one bit rate and a corresponding quality while a second layer e.g. a higher layer 34 provides improved coding with a higher bit rate and a corresponding higher quality. At the core layer encoded signals from one media stream appears in frames 35 that are separated by time gaps associated with the respective frames. In the gaps between the audio frames substitution signals are inserted. The substitution signals are taken from another media stream at the higher level. Exemplary the media stream at the core layer is an audio-only stream while the media stream at the higher layer is a audio-video stream.

It is also possible to apply the technology disclosed herein on a higher layer while the substitution signal is taken from the core (or some lower) layer. This makes it possible to place substitution signals or enhancement frames on those parts only of the signal which need refinement, while the lower layers can be used for deriving a suitable substitution signal.

It is also possible to take the substitution signals from a separate codec.

IP Transport Considerations

The use of the technology disclosed herein may in general be advantageous in IP communication systems that take advantage from reduced IP packet rates. Unlike conventional variable rate approaches with constant frame rate the technology disclosed herein can be used for decreasing the packet rate and hence the packetization overhead to the same extent as it reduces the average bit rate.

The technology disclosed herein can also be applied in scenarios with frame aggregation where multiple frames are transported per packet. In this case, however, it is to be noted that the time-stamp field in the RTP header is only indicative for the first sample of the first frame transported in the packet. Additional frames after the first frame follow the preceding frame without any specifiable offset. Hence, in order to make the principles of the technology disclosed herein directly applicable, all frames belonging to the packet have to be considered as super-frame unit, to which the most appropriate offset is derived. Though, it is also possible to make use of an explicit coding and transmission of the time offset parameter (s) making the technology disclosed herein applicable to full extent even in case of frame aggregation.

The direct application of the technology disclosed herein in cases where RoHC is used may lead to an increase of the IP overhead, since a non-regulr evolution of the time-stamp fields may require more frequent IP packet header updates. In this case, the gain achieved with the technology disclosed herein must be traded against the increase in IP overhead. One way to deal with this problem is to restrict the allowed frame offsets to a limited set (e.g. subframe offsets only), which can still be handled by RoHC without overhead increase. A second possibility especially applicable in a rate-constrained approach is to consider the IP overhead including RoHC efficiency loss in the modified metric, compare the section "Rate Constrained Approach".

Although some specific embodiments have been shown the technology disclosed herein may be modified in many ways within the scope of the claims.

The invention claimed is:

1. A method of operating at least one codec which operates on a digital signal comprising:
   using a frame based codec to time offset the start of processing of a first frame in relation to the end of the processing of a frame that precedes the first frame, the first frame being successive in frame sequence to the preceding frame;
   implementing the time offset by providing a time gap between the end of the preceding frame and the start of processing the first frame.

2. A method in accordance with claim 1, wherein the time offset varies from one processed frame to the next.

3. A method in accordance with claim 2, further comprising making the offset depending on a locally required bit rate.

4. A method in accordance with claim 2, further comprising determining a quality measure of the signal, as processed by the codec, in the preceding frame and that the time offset depends on the quality measure of the signal.

5. A method in accordance with claim 4, wherein the determining of the quality measure is based on a comparison of the original signal with the processed signal in the preceding frame.

6. A method in accordance with claim 2, wherein the first frame starts when there is a sudden change of the signal as processed in the preceding frame.

7. A method in accordance with claim 2, wherein the time offsets of a plurality of successive frames are simultaneously derived.

8. A method in accordance with claim 1, further comprising inserting a substitution signal in the time gap.

9. A method in accordance with claim 8, wherein the substitution signal is an extrapolation of the digital signal, as processed by the codec.

10. A method in accordance with claim 8, wherein the substitution signal is a directly encoded signal.

11. A method in accordance with claim 8, wherein the time offset varies from one processed frame to the next.

12. A method In accordance with claim 11, wherein the codec is a layered scalable codec and wherein the substitution signal is taken from a first layer of the codec, while the frames that are time offset in relation to the end of the processing of the frame that precedes the first frame are taken from a second layer.

13. A method in accordance with claim 12, wherein the signal as coded in the first layer is an audio signal and the signal in the second layer is an audio-video signal, wherein the encoded audio signal is inserted as substitution signal in the time gap between the first frame and the following frame.

14. A method in accordance with claim 12, wherein the signal as coded in the first layer is an audio-video signal and the signal in the second layer is an audio signal, and wherein the encoded audio-video signal is inserted as substitution signal in the time gap between the first frame and the following frame.

15. A method in accordance with claim 14, wherein the encoding of the signal is dependent on the characteristics of the channel over which the coded signal is transmitted.

16. A method in accordance with claim 11, wherein the substitution signal is an interpolation between the coded digital signal in the preceding frame and in the first frame.

17. A method in accordance with claim 11, further comprising comparing the digital signal with the substitution signal and as result returning a first deviation metric, the first deviation metric expressing the substitution signal's deviation from the digital signal.

18. A method in accordance with claim 17, wherein the first, second, third or fourth metrics are expressed in terms of a signal-to-noise ratio (SNR), a spectral deviation, a perceptual criterion, a cost function for the used bit rate or combinations thereof.

19. A method in accordance with claim 17, further comprising comparing the first deviation metric with a predefined first threshold and as result returning the time offset as the relative time instant when the first deviation metric function exceeds the predefined first threshold.

20. A method in accordance with claim 19, further comprising adjusting the first threshold based on a coding distortion calculated for the preceding frame.

21. A method in accordance with claim 20, further comprising calculating the coding distortion by comparing the digital signal with a coded signal in the preceding frame and as result returning a second deviation metric, which is used for adjusting the first threshold.

22. A method in accordance with claim 17, further comprising calculating the time offset using the substitution signal and the digital signal, as processed by the codec, in a first frame with zero offset.

23. A method in accordance with claim 22, further comprising comparing the digital signal, being the original speech signal, with the digital signal, as encoded by the codec, in the first frame with zero offset, and as result returning a third deviation metric, the third deviation metric being a function of the coding distortion of said first frame.

24. A method in accordance with claim 23, further comprising using the third deviation metric as a second threshold function, and comparing the first deviation metric with the second threshold function, and as result returning the time offset.

25. A method in accordance with claim 24, further comprising maintaining the substitution signal until the first deviation metric of the substitution signal exceeds the second threshold function.

26. A method in accordance with claim 11 further comprising obtaining the offset by deriving a measure of the coding distortion of the first frame.

27. A method in accordance with claim 26, further comprising:
a) selecting a candidate time offset among a plurality of time offset candidates,
b) processing the first frame with selected candidate time offset,
c) generating the substitution signal or using a pre-calculated substitution signal,
d) combining the substitution signal with the encoded first frame signal and as result returning a composite signal comprising a first and a second part, the first part containing a part of the substitution signal and of a duration generally corresponding to the selected candidate offset, the second part comprising the encoded first frame,
e) comparing the digital signal, being the original speech signal, with the composite signal and obtaining a fourth deviation metric,
f) evaluating in a predefined time interval (0-T) the fourth deviation metric obtained for the selected candidate time offset and obtaining an integrated deviation metric, and
g) storing the integrated deviation metric obtained for the selected candidate time offset,
h) repeating steps b) to g) for each candidate time offset and selecting as time offset the candidate that gives the minimum integrated deviation metric.

28. A method in accordance with claim 27, further comprising providing a smooth transition of the first part of the composite signal into its second part, the transition taking place over a certain time span.

29. A method in accordance with claim 27, wherein the predefined time interval starts at the end of the preceding frame.

30. A method of decoding a digital signal comprising:
offsetting the start of decoding of a first received frame in relation to an end of processing of the received frame that precedes the first received frame, the first received frame being successive in frame sequence to the preceding received frame:
implementing the time offset as a time gap between the end of the preceding received frame and the start of processing the first received frame, and by inserting a substitution signal in the time gap.

31. A method of decoding a digital signal in accordance with claim 30, wherein the time offset varies from one decoded received frame to the next.

32. A method of decoding a digital signal in accordance with claim 31, wherein
the substitution signal is an extrapolation of the decoded digital signal in the previous received frame.

33. A method of decoding a digital signal in accordance with claim 32, further comprising using as frame extrapolation algorithm an error concealing unit (ECU) algorithm.

34. A method of decoding a digital signal in accordance with claim 31, wherein the substitution signal is a directly encoded signal.

35. A method of decoding a digital signal in accordance with claim 31, using a layered scalable codec, further comprising using as substitution signal a signal taken from a first layer of the codec, while the time-offset frames are taken from a second layer.

36. A method of decoding a digital signal, in accordance with claim 35, wherein the signal as decoded in the first layer is an audio-video signal and the signal in the second layer is an audio signal, further comprising inserting the decoded audio-video signal as the substitution signal in the time gap between the first received frame and the following received frame.

37. A method of decoding a signal, in accordance with claim 35, wherein the signal as decoded in the first layer is an audio signal and the signal in the second layer is an audio-video signal, further comprising inserting the decoded audio signal as substitution signal in the time gap between the first received frame and the following received frame.

38. A method of decoding a digital signal in accordance with claim 31, further comprising using as the substitution signal an interpolation between the digital signal in the preceding received frame and in the first received frame.

39. A method in accordance with claim 31 wherein the substitution signal is produced using an error concealing unit (ECU) algorithm.

40. A method of decoding a digital signal in accordance with claim 31, further comprising using as a frame extrapolation algorithm a codec mode with an encoding rate less than that used for encoding.

41. A method of decoding a digital signal in accordance with claim 31, further comprising generating a decoded first received frame starting before the end of the decoded previous received frame thereby providing overlapping signal parts.

42. A method of decoding a digital signal in accordance with claim 41, further comprising adding the overlapping signal parts.

43. A method of decoding a digital signal in accordance with claim 41, further comprising suspending the overlapping part of the decoded previous received frame.

44. A method of decoding a digital signal in accordance with claim 30 wherein the substitution signal is processed during the time gap.

45. A method of decoding a digital signal in accordance with claim 30, using a layered scalable codec, wherein the substitution signal is a signal belonging to the first layer of the codec, while the time-offset frames belong to the second layer.

46. A frame based codec for providing encoded digital signals comprising:
time offset means for time offsetting the start of the processing of a first received frame in relation to the end of the processing of a received frame that precedes the first received frame, the first received frame being successive in frame sequence to the preceding received frame, said time offset means being adapted to delay the start of processing of the first received frame in relation to the end of the preceding received frame such that the first received frame has a positive time offset in relation to the end of the preceding received frame, the positive time offset bringing about a time gap between the end of the preceding received frame and the start of processing the first received frame, and signal substitution means for providing a substitution signal, and
substitution signal insertion means for inserting a substitution signal in the time gap.

47. A frame based codec in accordance with claim 46, wherein the time offset means is adapted to vary the time offset from one processed received frame to another.

48. A frame based codec for providing encoded signals in accordance with claim 47, wherein the substitution signal is an audio or speech signal and the encoded signal being an audio-video signal.

49. A frame based codec for providing encoded signals in accordance with claim 47, wherein said signal substitution means comprises extrapolation means for generating an extrapolation of the digital signal in the preceding received frame.

50. A frame based codec in accordance with claim 47, wherein said signal substitution means comprises interpolation means adapted to provide a substitution signal that is an interpolation between the coded digital signal in the preceding received frame and the coded digital signal in the first received frame.

51. A frame based codec for providing encoded signals in accordance with claim 47, wherein said signal substitution means comprises a separate coder.

52. A frame based codec for providing encoded signals in accordance with claim 47, wherein said separate coder is a layered scalable coder, the substitution signal being taken from a first layer of the coder and the encoded signal frames being taken from a second layer.

53. A frame based codec for providing encoded signals in accordance with claim 47, wherein the substitution signal is an audio-video signal and the encoded signal being an audio or speech signal.

54. A frame based codec for providing encoded signals in accordance with claim 47 wherein said time offset means is adapted to make the time offset depending on a locally required bit rate.

55. A frame based codec for providing encoded signals in accordance with claim 47, wherein said signal substitution means comprises an error concealing unit (ECU) for the extrapolation.

56. A frame based codec for providing encoded signals in accordance with claim 47, wherein said time offset means comprises a first deviation metric calculator for calculating a first deviation metric signal as a function of the time, the first deviation metric calculator having an input for the digital signal being the original speech signal, an input for the substitution signal, and an output providing the first deviation metric function from the input signals, the first deviation metric expressing the substitution signal's deviation from the digital signal being the original digital signal.

57. A frame based codec for providing encoded signals in accordance with claim 56, wherein the time offset means further comprises first threshold means for setting a first threshold for the first deviation metric function, the first threshold means having an input connected to the output of the first deviation metric calculator and an output for providing the time offset.

58. A frame based analyses-by-synthesis speech codec in accordance with claim 57, wherein the offset is generated as the relative time instant when the first deviation metric function exceeds the set first threshold.

59. A frame based codec for providing encoded signals in accordance with claim 58, wherein the substitution signal is an interpolation between the coded digital signal in the preceding received frame and in the first received frame.

60. A frame based codec for providing encoded signals in accordance with claim 58, further comprising a second deviation metric calculator for calculating a second deviation signal, the second deviation metric calculator having an input for the digital signal being the original speech signal, an input for the encoded signal in the preceding received frame, and an output providing a second deviation metric that takes the coding distortion into account.

61. A frame based codec for providing encoded signals in accordance with claim 60, wherein the output of the second deviation calculator is connected to an input of the first threshold means so as to adjust the first threshold with the coding distortion obtained for the signal in the preceding received frame.

62. A frame based codec for providing encoded signals in accordance with claim 56, further comprising a third deviation metric calculator for calculating a third deviation signal, the third deviation metric calculator having an input for the digital signal being the original speech signal, an input for the encoded signal in a first frame with zero offset, and an output providing a third deviation metric that takes the coding distortion in said first received frame into account.

63. A frame based codec for providing encoded signals in accordance with claim 62, wherein the time offset means further comprises second threshold means for setting a second threshold for the first deviation metric function, the second threshold means having an input connected to the output of the first deviation metric calculator and an output for providing the time offset.

64. A frame based codec for providing encoded signals in accordance with claim 56, wherein the time offset generating means comprises:
- a time offset selector adapted to select a candidate time offset among a plurality of time offset candidates,
- means for generating a substitution signal
- a combiner for combining for combining the substitution signal with the encoded first received frame signal to obtain at its output a composite signal comprising a first part and a second part, the first part containing a part of the substitution signal and of a duration corresponding to the selected time offset, the a second part comprising the encoded frame following the first received frame,
- a deviation metric calculator for calculating a fourth deviation metric signal pertaining to the deviation between the original signal and the composite signal on the output of the combiner,
- an integrator integrating the fourth deviation metric signal over a predefined time period so as to obtain a value of the fourth metric signal, and
- a storage for storing the fourth metric signal value obtained with the selected time offset candidate.

65. A frame based codec for providing encoded signals In accordance with claim 64, wherein the storage is adapted to store of the fourth deviation metric signals obtained with each of the offset candidates,
- the time offset means further comprising an optimizer adapted to select as offset the candidate offset that brings about the minimum integrated deviation metric signal.

66. A frame based codec for providing encoded signals in accordance with claim 65, wherein the predefined time period extends from the end of the preceding received frame to a predefined time instant.

67. A frame based codec in accordance with claim 46, wherein the codec is an analyses-by-synthesis speech codec.

68. A frame based codec for providing encoded signals in accordance with claim 67, wherein the output of the third deviation calculator is connected to an input of the second threshold means so as to adjust the second threshold with the coding distortion obtained for the signal in a first received frame with zero offset.

69. A frame based codec for providing encoded signals in accordance with claim 68, wherein the time offset means is adapted to generate the time offset signal as the relative time instant when the first deviation metric exceeds the third deviation metric.

70. A frame based codec for providing encoded signals in accordance with claim 69, wherein the time offset means is adapted to generate the time offset signal when the first deviation metric exceeds the third metric with a margin.

71. A radio communication device for transmission and reception of a digital signal divided into frames of constant duration, the device comprising:
- a frame based codec comprising time offset means for time offsetting the transmission of the first frame by a time offset relative to the end of the frame preceding the first frame, said time offset means being adapted to delay the start of processing of the first frame in relation to the end of the preceding frame such that the first frame has a positive time offset in relation to the end of the preceding frame, the positive time offset bringing about a time gap between the end of the preceding frame and the start of processing the first frame, and
- signal substitution means for providing a substitution signal, and substitution signal insertion means for inserting a substitution signal in the time gap.

72. A radio communication device in accordance with claim 71, wherein the time offset means is adapted to vary the time offset from a frame to frame.

73. A frame based codec configured to time offset the start of the processing of a first received frame in relation to the end of the processing of a received frame that precedes the first received frame, the first received frame being successive in frame sequence to the preceding received frame, the time offset being adapted to delay the start of processing of the first received frame in relation to the end of the preceding received frame such that the first received frame has a positive time offset in relation to the end of the preceding received frame, the positive time offset bringing about a time gap between the end of the preceding received frame and the start of processing the first received frame, and signal substitution means for providing a substitution signal, the frame based codec being further configured to inserting a substitution signal in the time gap.

74. A radio communication device for transmission and reception of a digital signal divided into frames of constant duration, the device comprising a frame based codec configured to time offset the transmission of the first frame by a time offset relative to the end of the frame preceding the first frame, said time offset adapted to delay the start of processing of the first frame in relation to the end of the preceding frame such that the first frame has a positive time offset in relation to the end of the preceding frame, the positive time offset bringing about a time gap between the end of the preceding frame and the start of processing the first frame, the frame based codec being further configured to provide a substitution signal and insert the substitution signal in the time gap.

* * * * *